(12) United States Patent
Kim

(10) Patent No.: US 12,171,254 B2
(45) Date of Patent: Dec. 24, 2024

(54) COFFEE ROASTING APPARATUS

(71) Applicant: Kyoung Nam Kim, Namyangju-si (KR)

(72) Inventor: Kyoung Nam Kim, Namyangju-si (KR)

(*) Notice: Subject to any disclaimer, the term of this patent is extended or adjusted under 35 U.S.C. 154(b) by 0 days.

(21) Appl. No.: 18/277,487

(22) PCT Filed: Feb. 16, 2022

(86) PCT No.: PCT/KR2022/002277
§ 371 (c)(1),
(2) Date: Aug. 16, 2023

(87) PCT Pub. No.: WO2022/177285
PCT Pub. Date: Aug. 25, 2022

(65) Prior Publication Data
US 2024/0090560 A1 Mar. 21, 2024

(30) Foreign Application Priority Data
Feb. 17, 2021 (KR) .................. 10-2021-0021246

(51) Int. Cl.
*A23N 12/12* (2006.01)
*B65G 47/14* (2006.01)

(52) U.S. Cl.
CPC ....... *A23N 12/125* (2013.01); *B65G 47/1407* (2013.01); *B65G 2201/0202* (2013.01)

(58) Field of Classification Search
CPC .............. A23N 12/125; B65G 47/1407; B65G 2201/0202
USPC ...................................................... 99/443 C
See application file for complete search history.

(56) References Cited

U.S. PATENT DOCUMENTS

| | | | | |
|---|---|---|---|---|
| 3,107,284 A | * | 10/1963 | Dixon | A21B 1/48 219/775 |
| 3,570,391 A | * | 3/1971 | Rejler | A47J 37/044 99/468 |
| 3,601,582 A | * | 8/1971 | Boisfleury | H05B 1/0225 219/412 |

(Continued)

FOREIGN PATENT DOCUMENTS

| JP | 2002-159824 A | 6/2002 |
|---|---|---|
| KR | 10-2009-0078766 B1 | 7/2009 |

(Continued)

OTHER PUBLICATIONS

International Search Report for PCT/KR2022/002277, dated May 24, 2022.

(Continued)

*Primary Examiner* — Jimmy Chou
(74) *Attorney, Agent, or Firm* — Sughrue Mion, PLLC

(57) ABSTRACT

Provided is a coffee roasting apparatus including a roasting portion formed in a tubular shape having a predetermined length along an advancing direction and formed to have an inner space having a set temperature to roast coffee beans; a conveying portion formed to pass through the roasting portion from the front to rear thereof and installed to be rotatable from the inside to outside of the roasting portion to repeatedly rotate along the same trajectory; and a supply portion installed at an upper side of the conveying portion at the front of the roasting portion to supply coffee beans so that one or more coffee beans continuously fall onto the conveying portion.

4 Claims, 6 Drawing Sheets

(56) References Cited

U.S. PATENT DOCUMENTS

| | | | | | |
|---|---|---|---|---|---|
| 4,039,794 | A | * | 8/1977 | Kasper | H05B 6/105 |
| | | | | | 148/567 |
| 4,089,259 | A | * | 5/1978 | Stickle | B02C 9/04 |
| | | | | | 241/101.5 |
| 4,176,589 | A | * | 12/1979 | Stuck | A47J 37/044 |
| | | | | | 99/443 C |
| 4,326,114 | A | * | 4/1982 | Gerling | A23N 12/10 |
| | | | | | 426/466 |
| 4,366,177 | A | * | 12/1982 | Wells | A21B 1/48 |
| | | | | | 426/243 |
| 4,448,117 | A | * | 5/1984 | Wells | A47J 37/044 |
| | | | | | 99/401 |
| 4,462,307 | A | * | 7/1984 | Wells | A47J 37/044 |
| | | | | | 126/21 R |
| 4,492,839 | A | * | 1/1985 | Smith | A23L 5/17 |
| | | | | | 219/699 |
| 4,565,704 | A | * | 1/1986 | Dagerskog | A21B 1/48 |
| | | | | | 426/243 |
| 4,701,340 | A | * | 10/1987 | Bratton | A21B 1/245 |
| | | | | | 426/511 |
| 4,737,373 | A | * | 4/1988 | Forney | A23L 5/17 |
| | | | | | 426/523 |
| 5,334,402 | A | * | 8/1994 | Ovadia | A21D 8/06 |
| | | | | | 426/243 |
| 5,570,626 | A | * | 11/1996 | Vos | A47J 37/1238 |
| | | | | | 99/407 |
| 5,597,597 | A | * | 1/1997 | Newman | A23B 4/015 |
| | | | | | 250/455.11 |
| 5,802,959 | A | * | 9/1998 | Benson | A47J 37/044 |
| | | | | | 219/679 |
| 6,049,066 | A | * | 4/2000 | Wilson | A21B 1/245 |
| | | | | | 34/223 |
| 6,080,438 | A | * | 6/2000 | Hyllstam | A23L 5/15 |
| | | | | | 426/523 |
| 7,316,080 | B1 | * | 1/2008 | Woolsey | F26B 17/04 |
| | | | | | 34/223 |
| 7,849,788 | B2 | * | 12/2010 | Macaluso | A23L 25/20 |
| | | | | | 426/456 |
| 8,637,792 | B2 | * | 1/2014 | Agnello | A21B 1/48 |
| | | | | | 219/400 |
| 11,930,825 | B2 | * | 3/2024 | Sammon | G05D 23/1951 |
| 2011/0020492 | A1 | * | 1/2011 | Ajmera | A21D 13/00 |
| | | | | | 426/549 |
| 2011/0151088 | A1 | * | 6/2011 | Newman | A23L 3/375 |
| | | | | | 62/52.1 |
| 2011/0177221 | A1 | * | 7/2011 | Kano | A23L 5/13 |
| | | | | | 426/511 |
| 2012/0015084 | A1 | * | 1/2012 | Howard | A47J 37/044 |
| | | | | | 426/523 |
| 2012/0088019 | A1 | * | 4/2012 | Bourg, Jr. | A47J 37/044 |
| | | | | | 426/466 |
| 2013/0055907 | A1 | * | 3/2013 | Brandt, Jr. | A23G 4/025 |
| | | | | | 99/516 |
| 2013/0156909 | A1 | * | 6/2013 | Yum | A23L 5/13 |
| | | | | | 426/396 |
| 2013/0330448 | A1 | * | 12/2013 | Holman | G16Z 99/00 |
| | | | | | 99/485 |
| 2015/0342227 | A1 | * | 12/2015 | Verbruggen | A23L 5/15 |
| | | | | | 426/455 |

FOREIGN PATENT DOCUMENTS

| | | |
|---|---|---|
| KR | 10-0958150 B1 | 5/2010 |
| KR | 10-1448524 B1 | 10/2014 |
| KR | 10-2017-0079323 A | 7/2017 |
| KR | 10-2017-0104243 A | 9/2017 |
| KR | 10-1780308 B1 | 9/2017 |
| KR | 10-1798893 B1 | 11/2017 |
| KR | 10-1802321 B1 | 11/2017 |
| KR | 10-2004953 B1 | 10/2019 |
| KR | 10-2077991 B1 | 2/2020 |

OTHER PUBLICATIONS

Korean Office Action for 10-2021-0024246, dated Jun. 11, 2021.
Korean Decision on Registration for 10-2021-0021246, dated Sep. 14, 2021.

* cited by examiner

[FIG. 1]
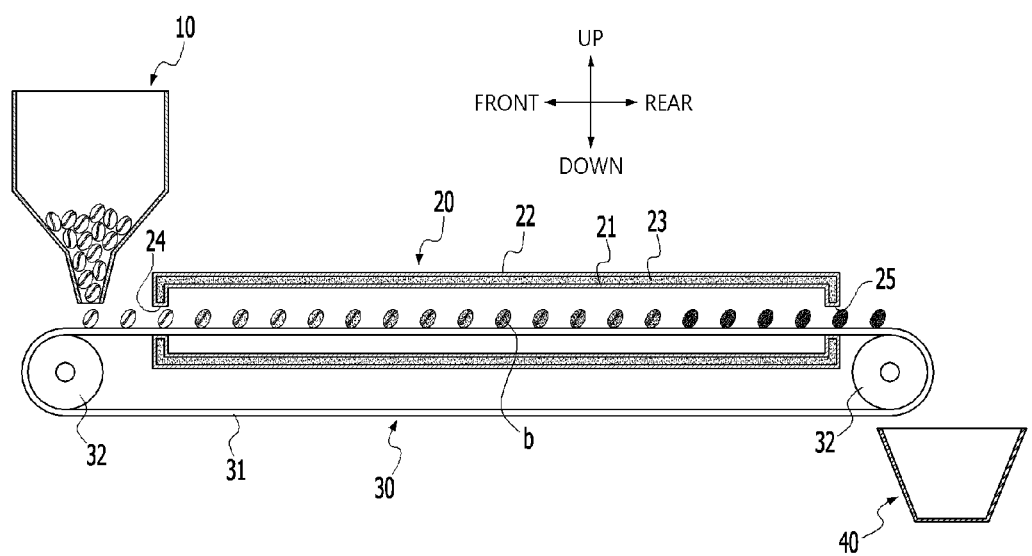

[FIG. 2]
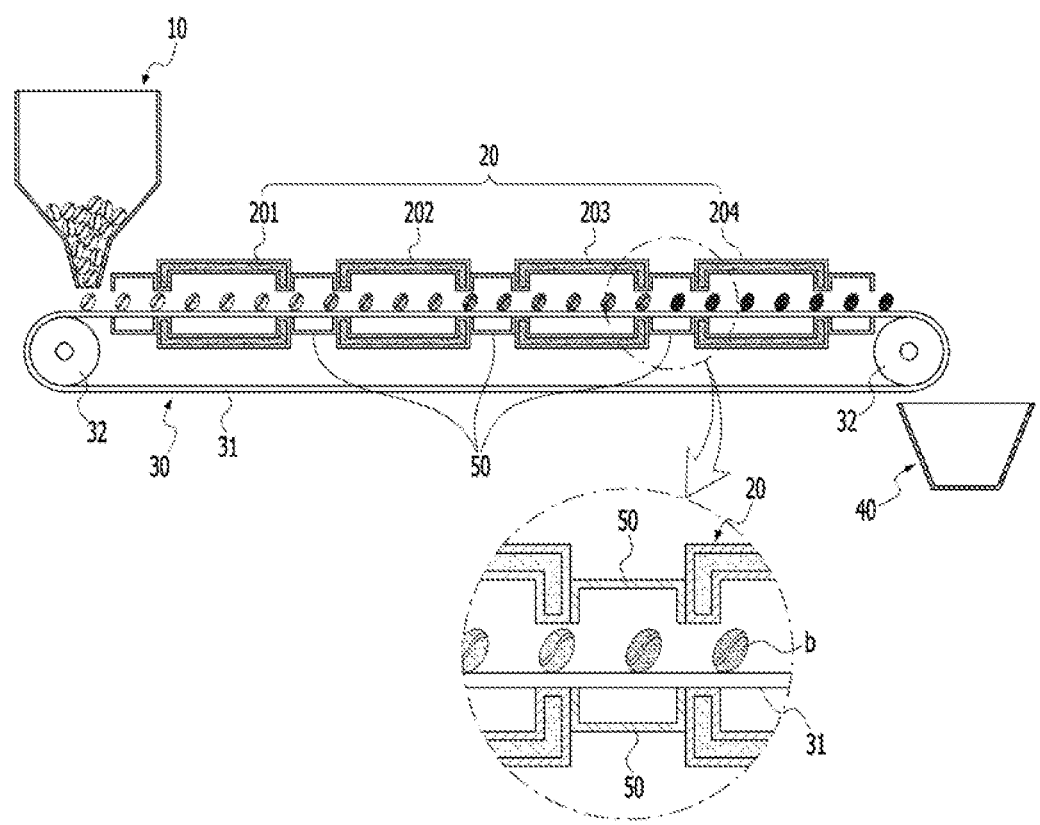

[FIG. 3]
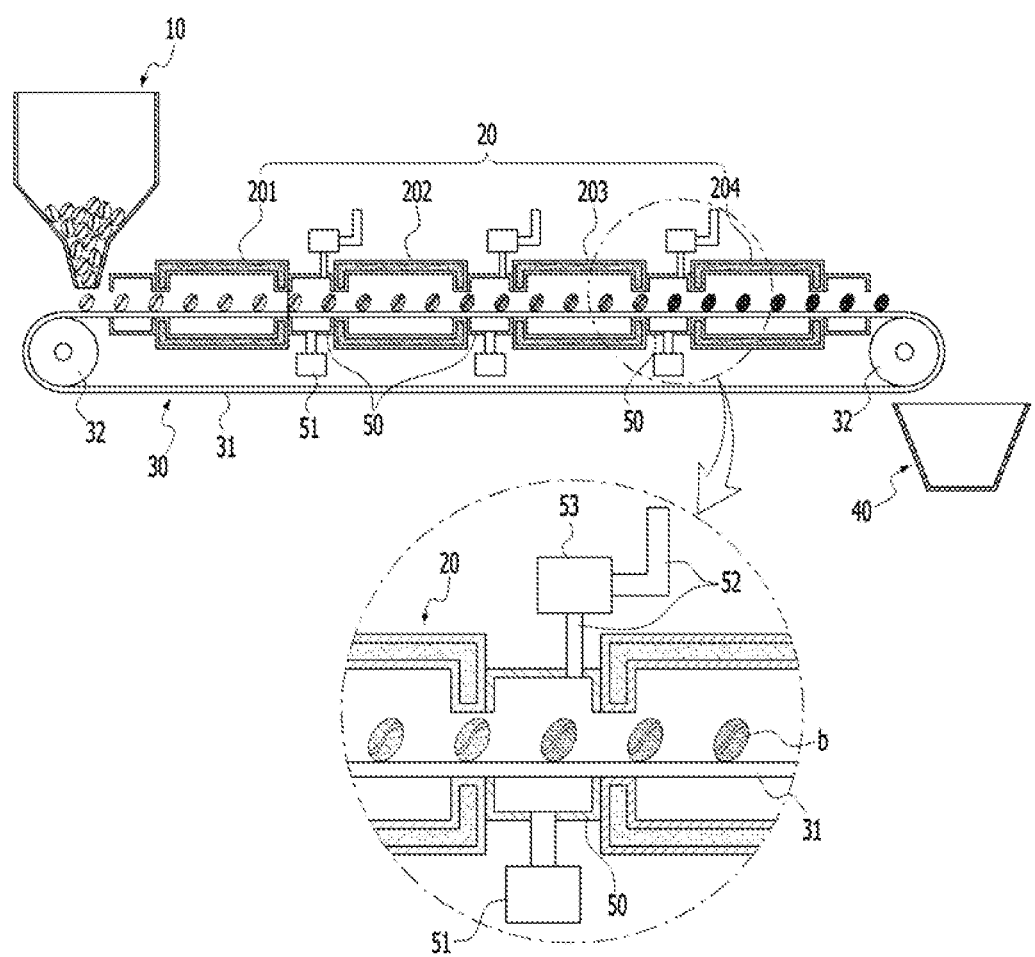

[FIG. 4]
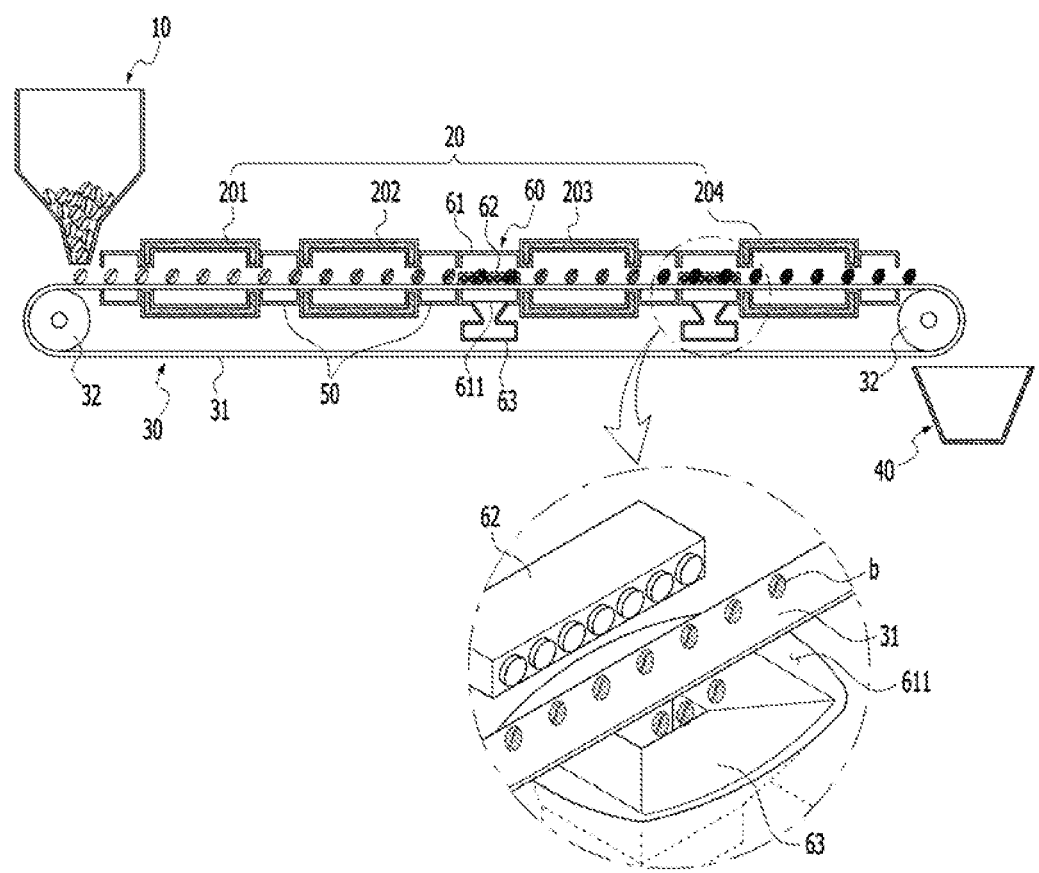

[FIG. 5]
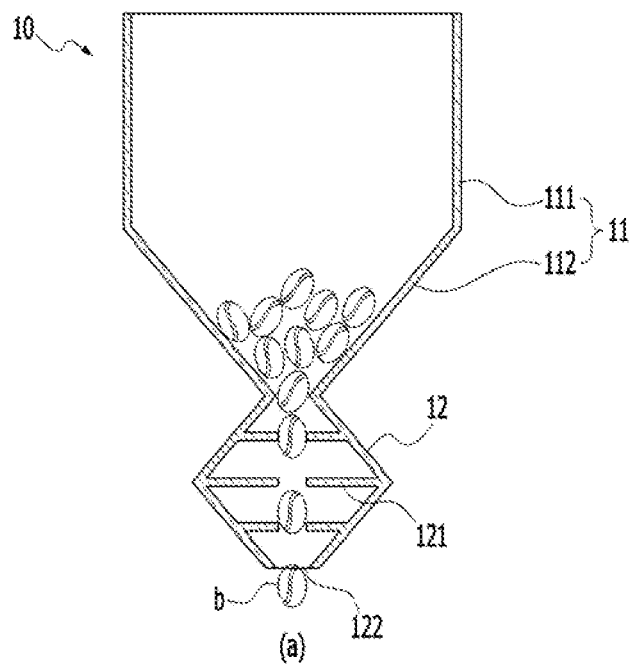
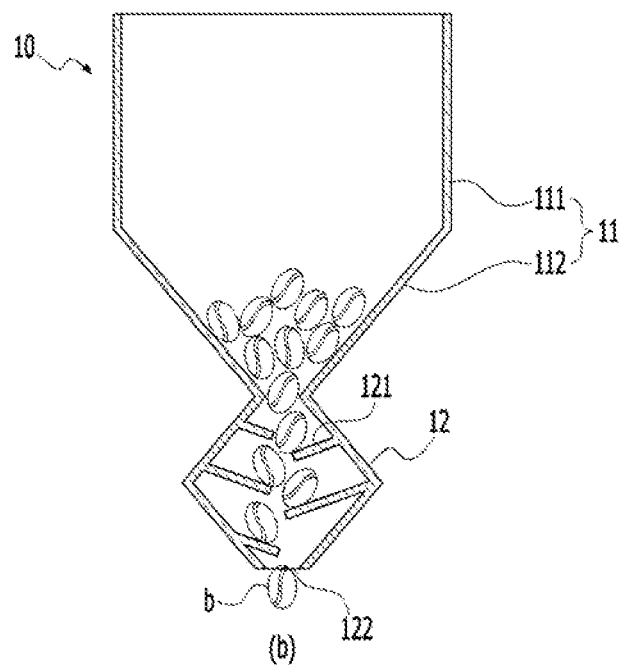

[FIG. 6]
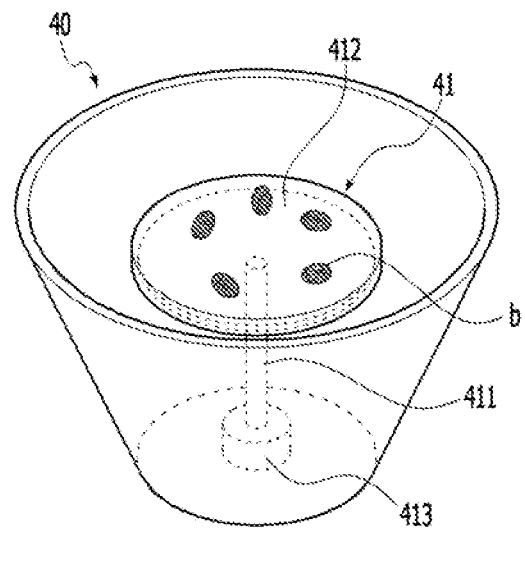
(a)
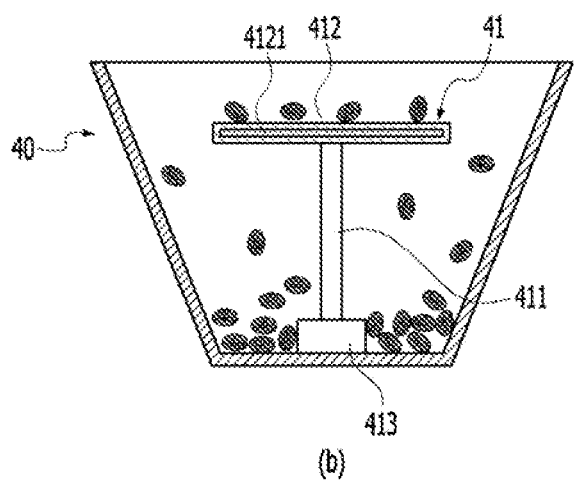
(b)

COFFEE ROASTING APPARATUS

CROSS REFERENCE TO RELATED APPLICATIONS

This application is a National Stage of International Application No. PCT/KR2022/002277 filed Feb. 16, 2022, claiming priority based on Korean Patent Application No. 10-2021-0021246 filed Feb. 17, 2021, the entire disclosures of which are incorporated herein by reference.

TECHNICAL FIELD

The present disclosure relates to a coffee roasting apparatus.

BACKGROUND ART

Generally, coffee beans themselves are tasteless and odorless, but when the beans undergo a roasting process which is a task of heating and roasting the beans at a high temperature, as the cellular tissue of the beans is destroyed, a taste and an odor are generated as various components (fat, sugar, organic acid, caffeine, and the like) are activated.

How well the coffee beans are roasted is the most important factor that determines the taste and odor of coffee. More specifically, through a roasting process, green coffee beans made of over 2,000 different substances are roasted for about 30 minutes at a temperature in a range of 220 to 230° C. and become coffee beans having components that can create 700 to 850 different flavors. Some components are strengthened and some components are less affected during the roasting process, and the taste and odor may significantly differ according to a roasting method.

A roasting strength may be recognized by looking at the color of roasted coffee beans and may be classified into eight stages including light, cinnamon, medium, high, city, full city, French, and Italian or classified into three stages including strong, medium, and weak, according to a roasting temperature.

In recent years, coffee roasters (roasting apparatuses) configured to allow coffee to be made by instantly roasting coffee beans even in households or small-scale coffeehouses have been developed with changes in the demand of consumers and the consumption culture and an increase in the number of consumers who want to have fresh coffee that fits their own preferences.

The conventional coffee roasting apparatus has a rotatable stirring blade coupled to a cylindrical drum inside a housing and is configured to roast coffee beans accommodated in the cylindrical drum by a heat source installed under the housing and the cylindrical drum.

In this case, because a large amount of coffee beans inside the drum are roasted at once, there is a problem that, even if the stirring blade is rotated to mix the coffee beans inside the drum, it is not possible to uniformly roast the large amount of coffee beans. Specifically, the coffee beans roasted while placed for a long period of time at the bottom of the drum where the heat source is installed thereunder are roasted to a darker color, and the coffee beans roasted while placed for a long period of time at an upper portion far away from the bottom of the drum where the heat source is installed thereunder are roasted to a lighter color, causing the roasted coffee beans to have different tastes. In this case, due to variations in the roasting states and quality of coffee beans, there is a problem that it is not possible to supply coffee beans according to the consumers' own preferences.

Further, because the temperature of the heat source should be set differently each time according to the amount of coffee beans supplied to the drum to be roasted, there is a problem that production conditions for roasting the coffee beans to a uniform quality are difficult to achieve.

RELATED ART DOCUMENT (Patent Document) Korean Patent Registration No. 10-2077991 (Feb. 11, 2020)

DISCLOSURE

Technical Problem

The present disclosure is directed to providing a coffee roasting apparatus that can eliminate variations according to roasting states of coffee beans that occur in the conventional roasting equipment and reduce variations in production conditions and coffee bean roasting quality that vary according to the amount of coffee beans added into a chamber of roasting equipment to enable roasting in the same conditions regardless of the amount of added coffee beans and obtain a more uniform roasting quality.

The present disclosure is also directed to providing a coffee roasting apparatus that can automate the entire roasting process and, because coffee beans in an arranged state are roasted by constantly passing through a roasting portion that applies heat, produce coffee beans in a uniform roasting state.

The present disclosure is also directed to providing a coffee roasting apparatus that can eliminate a loss rate due to a test because the same system process method is used for sample production and mass-production during roasting of coffee beans.

Technical Solution

One embodiment of the present disclosure provides a coffee roasting apparatus including: a roasting portion formed in a tubular shape having a predetermined length along an advancing direction and formed to have an inner space having a set temperature to roast coffee beans; a conveying portion formed to pass through the roasting portion from the front to rear thereof and installed to be rotatable from the inside to outside of the roasting portion to repeatedly rotate along the same trajectory; and a supply portion installed at an upper side of the conveying portion at the front of the roasting portion to supply coffee beans so that one or more coffee beans continuously fall onto the conveying portion, wherein, when the conveying portion rotates along the same trajectory and the conveying portion is inserted into the roasting portion at the front of the roasting portion, the one or more coffee beans supplied from the supply portion to the conveying portion are inserted into the roasting portion, and a plurality of coffee beans arranged on the conveying portion are roasted.

Also, the coffee roasting apparatus may further include a collecting portion disposed at a lower side of a rear of the conveying portion to collect the coffee beans roasted in the roasting portion that fall according to the rotation of the conveying portion.

Also, the roasting portion may be formed to be separated into a plurality of roasting portions, and temperature control of the inner space may be possible for each of the plurality of roasting portions.

Also, the plurality of roasting portions may be disposed to be spaced apart from each other at predetermined intervals, and the coffee roasting apparatus may further include a connection pipe disposed between the plurality of roasting portions disposed to be spaced apart to connect the spaced-apart roasting portions.

In addition, in the connection pipe, a gas supply portion into which a mixed gas, which is a mixture of nitrogen and oxygen, is supplied to prevent carbonization of an outer surface of the coffee beans and an exhaust tube configured to discharge an exhaust gas and particulate matter inside the connection pipe to the outside may be further installed.

Advantageous Effects

According to an embodiment of the present disclosure, variations according to roasting states of coffee beans that occur in the conventional roasting equipment can be eliminated, and variations in production conditions and coffee bean roasting quality that vary according to the amount of coffee beans added into a chamber of roasting equipment can be reduced to enable roasting in the same conditions regardless of the amount of added coffee beans and obtain a more uniform roasting quality.

Also, the entire roasting process can be automated, and because coffee beans in an arranged state are roasted by constantly passing through a roasting portion that applies heat, coffee beans can be produced in a uniform roasting state.

In addition, a loss rate due to a test can be eliminated because the same system process method is used for sample production and mass-production during roasting of coffee beans.

DESCRIPTION OF DRAWINGS

FIG. 1 is a view illustrating a coffee roasting apparatus according to one embodiment of the present disclosure.

FIG. 2 is a view illustrating a coffee roasting apparatus according to another embodiment of the present disclosure.

FIG. 3 is a view illustrating a state in which a gas supply portion and an exhaust tube are installed in a connection pipe according to FIG. 2.

FIG. 4 is a view illustrating a coffee roasting apparatus according to still another embodiment of the present disclosure.

FIG. 5 is a view illustrating another embodiment of a supply portion of the present disclosure.

FIG. 6 is a view illustrating another embodiment of a collecting portion of the present disclosure.

BEST MODE OF THE DISCLOSURE

Hereinafter, specific embodiments of the present disclosure will be described with reference to the accompanying drawings. However, the embodiments are merely illustrative, and the present disclosure is not limited thereto.

In describing the present disclosure, when detailed description of a known art related to the present disclosure is determined as having the possibility of unnecessarily obscuring the gist of the present disclosure, the detailed description thereof will be omitted. Also, terms used below are terms defined in consideration of functions in the present disclosure and may vary according to an intention or customary practice of a user or an operator. Therefore, the terms should be defined based on the content throughout the specification.

The technical spirit of the present disclosure is determined by the claims, and the following embodiments are only means for efficiently describing the technical spirit of the present disclosure to those of ordinary skill in the art to which the present disclosure pertains.

FIG. 1 is a view illustrating a coffee roasting apparatus 1 according to one embodiment of the present disclosure.

Referring to FIG. 1, the coffee roasting apparatus 1 according to one embodiment of the present disclosure may include a supply portion 10, a roasting portion 20, a conveying portion 30, and a collecting portion 40.

The supply portion 10 may be installed to be positioned at an upper side of the conveying portion 30 at a front of the roasting portion 20. The supply portion 10 may supply coffee beans to the conveying portion 30 so that one or more coffee beans b continuously fall onto the conveying portion 30. For example, the supply portion 10 may continuously supply one coffee bean b at a time to the conveying portion 30. However, the supply portion 10 is not limited to supplying one coffee bean b at a time and may continuously supply one or more coffee beans b to the conveying portion 30.

For example, the supply portion 10 may be made of a hopper 11 and formed so that a diameter gradually decreases downward, and an outlet through which coffee beans are discharged may be formed with a size that is greater than a long-axis length of one coffee bean but does not allow two coffee beans to simultaneously pass. Therefore, coffee beans added to the supply portion 10 may move to a lower portion of the supply portion 10 whose diameter gradually narrows and may fall one at a time through the outlet. Alternatively, one or two coffee beans b may be supplied from the supply portion 10 to the conveying portion 30, or the diameter of the lower portion of the supply portion 10 may be formed so that two or three coffee beans b are supplied to the conveying portion 30.

In this way, the size of the diameter of the lower portion of the supply portion 10 may be determined by a designer according to the number of coffee beans supplied from the supply portion 10 to the conveying portion 30.

The roasting portion 20 extends from the front to rear along an advancing direction and may be formed in a tubular shape having a predetermined length. The roasting portion 20 may have an inner space having a set temperature to roast coffee beans.

The roasting portion 20 may include an inner tube 21, an outer tube 22, a heater 23, an insertion portion 24, and a withdrawal portion 25.

The inner tube 21 may be a tube having an inner space formed therein to allow a conveyor belt 31 of the conveying portion 30 to pass through the inner tube 21, and the outer tube 22 may be spaced a predetermined distance apart from an outer side of the inner tube 21 and fixed to the inner tube 21.

The heater 23 may be disposed in a space between the inner tube 21 and the outer tube 22, and heat may be applied to the space inside the inner tube 21. The heater 23 may be configured as a heating means such as a hot wire. In this way, by heat being applied to the inner portion of the inner tube 21 by the heater 23, coffee beans inserted into the inner tube 21 may be roasted by being treated with heat. The insertion portion 24 is an open area formed at the front of the inner tube 21 and the outer tube 22 that are coupled and fixed, and the conveyor belt 31 may be inserted into the space inside the inner tube 21 through the insertion portion 24. The withdrawal portion 25 is an open area formed at the rear of the inner tube 21 and the outer tube 22 that are coupled and fixed, and the conveyor belt 31 inserted into the space inside the inner tube 21 through the insertion portion 24 may be withdrawn to the space outside the inner tube 21 through the withdrawal portion 25.

Here, the total length along the front-rear direction of the inner tube 21 and the outer tube 22 may be formed as a length that allows coffee beans moving from the front to rear of the inner tube 21 by the conveying portion 30 to stay inside the inner tube 21 for the minimum amount of time required to roast the coffee beans.

However, the coffee beans may be roasted while a conveying speed of the conveying portion 30 is changed according to the length of the inner tube 21 and the outer tube 22 and the temperature inside the inner tube 21. For example, under the same temperature condition, when the length of the inner tube 21 is formed to be short, the conveying speed of the conveying portion 30 may be reduced to extend a roasting time during which the coffee beans are positioned inside the inner tube 21. Conversely, when the length of the inner tube 21 is formed to be long, the conveying speed of the conveying portion 30 may be increased to make the roasting time during which the coffee beans are positioned inside the inner tube 21 correspond to a reference roasting time.

The conveying portion 30 may pass through the roasting portion 20 from the front to rear thereof and may be installed to be rotatable from the inside to outside of the roasting portion 20 to repeatedly rotate along the same trajectory.

The conveying portion 30 may include the conveyor belt 31 and a rotating portion 32.

The conveyor belt 31 may pass through the roasting portion 20 from the front to rear thereof and may be installed to be rotatable from the inside to outside of the roasting portion 20 to rotate in an infinite trajectory along the same trajectory by having both ends formed to be connected.

The rotating portion 32 may be disposed at an inner side of a front end portion of the conveyor belt and an inner side of a rear end portion of the conveyor belt at each of the front and rear of the roasting portion 20 and may receive a driving force from a driving portion (not illustrated) and rotate. Here, a direction in which the rotating portion 32 rotates may cause the conveyor belt 31 to rotate to move from the front to rear of the roasting portion 20 along the advancing direction.

Roasted coffee beans may be stored in the collecting portion 40 after being discharged. The collecting portion 40 may be disposed at a rear of the conveying portion 30, and as the conveyor belt 31 rotates, roasted coffee beans may move downward from an upper surface of the conveyor belt 31 and fall to the inside of the collecting portion 40.

Hereinafter, the operation of the coffee roasting apparatus 1 according to one embodiment of the present disclosure will be described.

The heater 23 of the roasting portion 20 may be operated so that the space inside the roasting portion 20 is maintained at an appropriate temperature for roasting coffee beans. Therefore, the space inside the roasting portion 20 is heated to a temperature at which coffee beans can be roasted. The conveyor belt 31 of the conveying portion 30 may be rotated to pass through the space inside the roasting portion 20 that is heated as described above.

In the state in which the conveyor belt 31 is rotated, one or more coffee beans fall from the supply portion 10 disposed at the upper side of the front of the conveying portion 30. Here, because the conveyor belt 31 is continuously moving from the front to rear, a small amount of coffee beans, such as one to three coffee beans, may fall from the supply portion 10 and be separately arranged while being spaced apart at predetermined intervals on the upper surface of the conveyor belt 31. In the state in which the coffee beans are separately arranged one by one without being stuck to each other on the upper surface of the conveyor belt 31, as the conveyor belt 31 continues to be rotated from the front to rear, the coffee beans may be inserted into the roasting portion 20 through the insertion portion 24 of the roasting portion 20.

The coffee beans inserted into the roasting portion 20 may be moved along the conveyor belt 31 inside the roasting portion 20 and be roasted by being treated with heat of the roasting portion 20.

Then, as the conveyor belt 31 continues to rotate, the coffee beans may be sequentially withdrawn to the outside through the withdrawal portion 25 of the roasting portion 20. In this way, roasting of the coffee beans arranged on the upper surface of the conveyor belt 31 may be ended as the conveyor belt 31 continues to rotate and the coffee beans are withdrawn to the outside through the withdrawal portion 25 of the roasting portion 20.

Then, as the conveyor belt 31 is rotated and a surface on which the roasted coffee beans are placed gradually moves to a lower side, the coffee beans arranged on the conveyor belt 31 may fall and be discharged to the collecting portion 40.

In this way, the coffee roasting apparatus 1 according to one embodiment of the present disclosure is not a system in which a large amount of coffee beans are added to a drum at once and heat is applied thereto, and by allowing one or more coffee beans to be arranged and pass through the roasting portion 20, even a large amount of coffee beans can be uniformly roasted regardless of the amount of coffee beans being roasted.

FIG. 2 is a view illustrating a coffee roasting apparatus 1 according to another embodiment of the present disclosure, and FIG. 3 is a view illustrating a state in which a gas supply portion 51 and an exhaust tube 52 are installed in a connection pipe 50 according to FIG. 2.

Referring to FIGS. 2 and 3, the roasting portion 20 may be formed to be separated into a plurality of roasting portions. Specifically, the roasting portion 20 may be formed to be separated into a first roasting portion 201, a second roasting portion 202, a third roasting portion 203, and a fourth roasting portion 204. For example, the length of the roasting portion 20 illustrated in FIGS. 2 and 3 may be formed to be shorter than the length of the roasting portion 20 illustrated in FIG. 1, and a plurality of roasting portions 20 may be disposed to be spaced apart from each other.

Temperature control of the inner space is possible for each of the first roasting portion 201, the second roasting portion 202, the third roasting portion 203, and the fourth roasting portion 204. That is, the heater 23 of each of the first roasting portion 201, the second roasting portion 202, the third roasting portion 203, and the fourth roasting portion 204 may be controlled to adjust the roasting temperature. For example, the first roasting portion 201, the second roasting portion 202, the third roasting portion 203, and the fourth roasting portion 204 may be set so that internal temperatures thereof sequentially increase.

The connection pipe 50 for connecting adjacent roasting portions 20 may be disposed between the first roasting portion 201, the second roasting portion 202, the third roasting portion 203, and the fourth roasting portion 204 disposed to be spaced apart from each other at predetermined intervals.

The connection pipe 50 may be connected between the first roasting portion 201, the second roasting portion 202, the third roasting portion 203, and the fourth roasting portion 204 disposed to be spaced apart from each other and may allow the conveyor belt 31 having coffee beans arranged thereon to pass therethrough.

Here, referring to FIG. 3, the gas supply portion 51, the exhaust tube 52, and a dust collector 53 may be installed in the connection pipe 50.

The gas supply portion 51 may be connected to the connection pipe 50 and supply a mixed gas, which is a mixture of nitrogen and oxygen, into the connection pipe 50 to prevent carbonization of an outer surface of the coffee beans. For example, the mixed gas may be $N_2H_2$ (98%2%) gas.

The exhaust tube 52 may be connected to the connection pipe 50 and discharge an exhaust gas and particulate matter inside the connection pipe 50 to the outside.

The dust collector 53 may be connected to the exhaust tube 52 to forcibly suction smoke such as an exhaust gas or particular matter inside the connection pipe 50 and discharge the suctioned smoke to the outside through the exhaust tube 52.

FIG. 4 is a view illustrating a coffee roasting apparatus 1 according to still another embodiment of the present disclosure.

Referring to FIG. 4, the coffee roasting apparatus 1 may further include a discharge portion 60. The discharge portion 60 may allow coffee beans to be discharged without being roasted further when roasting is completed to a desired level in each roasting portion in the process in which the plurality of roasting portions 20 perform roasting at different temperatures.

For example, the internal temperatures of the first roasting portion 201, the second roasting portion 202, the third roasting portion 203, and the fourth roasting portion 204 are set to gradually increase. That is, coffee beans may be roasted by being gradually exposed to higher temperatures while being supplied from the first roasting portion 201 to the fourth roasting portion 204. Here, the discharge portion 60 may be installed between the second roasting portion 202 and the third roasting portion 203 and installed between the third roasting portion 203 and the fourth roasting portion 204. In this way, the discharge portion 60 installed between the second roasting portion 202 and the third roasting portion 203 may allow coffee beans roasted to the temperature of the second roasting portion 202 to be discharged and may gather the coffee beans roasted to the temperature of the second roasting portion 202. Likewise, the discharge portion 60 installed between the third roasting portion 203 and the fourth roasting portion 204 may allow coffee beans roasted to the temperature of the third roasting portion 203 to be discharged and may gather the coffee beans roasted to the temperature of the third roasting portion 203.

The discharge portion 60 may include a housing 61, an air blowing device 62, and a collecting drum 63.

The housing 61 may be disposed to be connected to the connection pipe 50 disposed at the rear of the second roasting portion 202 or the third roasting portion 203. The conveyor belt 31 may pass through the housing 61. An opening 611 may be formed to have a predetermined length on a lower surface of the housing 61. The collecting drum 63 may be connected to the opening 611.

The housing 61 may be formed to be larger than the width of the conveyor belt 31, and the air blowing device 62 may be installed at one side of the conveyor belt 31.

The air blowing device 62 may be installed at one side of the conveyor belt 31 inside the housing 61 and may supply a predetermined wind in a direction toward the other side which is a direction toward the conveyor belt 31. As the air blowing device 62 supplies the wind toward the other side, coffee beans disposed on the upper surface of the conveyor belt 31 move in the direction toward the other side and fall. The fallen coffee beans fall onto the collecting drum 63 through the opening 611.

The collecting drum 63 may be fixed to the opening 611 of the housing 61 and collect the coffee beans falling from the conveyor belt 31.

In this way, in the process in which coffee beans pass through the second roasting portion 202 and move to the third roasting portion 203, as the coffee beans pass through the discharge portion 60 disposed between the second roasting portion 202 and the third roasting portion 203, the coffee beans may be discharged to the collecting drum 63 by the air blowing device 62. Here, when the air blowing device 62 is not operated, the coffee beans on the upper surface of the conveyor belt 31 may be conveyed to a subsequent section along the conveyor belt 31 and inserted into the third roasting portion 203.

Likewise, in the process in which coffee beans pass through the third roasting portion 203 and move to the fourth roasting portion 204, as the coffee beans pass through the discharge portion 60 disposed between the third roasting portion 203 and the fourth roasting portion 204, the coffee beans may be discharged to the collecting drum 63 by the air blowing device 62. Here, when the air blowing device 62 is not operated, the coffee beans on the upper surface of the conveyor belt 31 may be conveyed to a subsequent section along the conveyor belt 31 and inserted into the fourth roasting portion 204.

In this way, as the discharge portion 60 is installed, coffee beans roasted to different levels may be collected.

FIG. 5 is a view illustrating another embodiment of the supply portion 10 of the present disclosure.

Referring to FIG. 5, the supply portion 10 may be made of the hopper 11 and a feeding portion 12 to supply coffee beans one at a time to the conveyor belt 31.

The hopper 11 may be made of a vertical portion 111 and an inclined portion 112.

The vertical portion 111 is an upper portion of the hopper 11 that allows a large amount of coffee beans to be fed.

The inclined portion 112 may be formed to extend downward from a lower end of the vertical portion 111 and may be formed so that a diameter gradually decreases downward. An open portion at a lower end of the inclined portion 112 whose diameter gradually narrows may be formed to have a size that allows one to three coffee beans to pass.

The feeding portion 12 may be connected to a lower end of the hopper 11. The feeding portion 12 may have a rhombic cross-section and may be connected to the lower end of the hopper 11. That is, the feeding portion 12 may extend in a form in which a diameter increases again from the lower end of the hopper 11 and then may extend in a form in which the diameter decreases again. Here, an inlet 122 formed at a lower end of the feeding portion 12 may be formed to be larger than the length of the long axis of one coffee bean but may be formed to have a size that does not allow two coffee beans to simultaneously pass. Therefore, the coffee beans falling through the inlet 122 may fall one at a time through the inlet 122.

A wing portion 121 may be formed inside the feeding portion 12. For example, the wing portion 121 may be formed to protrude toward a central portion from inner sidewalls at both sides of the feeding portion 12, and ends of the wing portions 121 protruding from both sides may be formed to protrude to be spaced apart from each other by as much as a distance that allows one coffee bean to pass. A plurality of wing portions 121 may be formed to be spaced apart along the height of the feeding portion 12.

Here, referring to (a) of FIG. 5, the wing portions 121 may be formed to protrude the same length from the inner sidewalls at both sides of the feeding portion 12 while facing each other, and a separation distance between the wing portions 121 at both sides and the inlet 122 may be formed to be collinear.

Referring to (b) of FIG. 5, the wing portions 121 may be formed to have different heights and lengths from each other at the inner sidewalls at both sides and may be formed to be inclined so that ends face downward. Therefore, the separation distance between the wing portions 121 at both sides may be formed to be alternately positioned at the left side and right side.

The wing portions 121 may be formed of a flexible material such as silicone, and as the coffee beans move downward from the hopper 11, the wing portions 121 are bent downward due to the weight of the coffee beans such that the separation distance between the wing portions 121 at both sides increases, and accordingly, the coffee beans may fall. In this way, by using the wing portions 121 of the feeding portion 12 to reduce the falling speed of the coffee beans, the coffee beans can fall one at a time through the inlet 122.

FIG. 6 is a view illustrating another embodiment of the collecting portion 40 of the present disclosure. (a) of FIG. 6 is a perspective view of the collecting portion 40 having a coffee bean cooling portion 41 installed therein, and (b) of FIG. 6 is a cross-sectional view of the collecting portion 40 having the coffee bean cooling portion 41 installed therein.

Referring to FIG. 6, the coffee bean cooling portion 41 may be further installed in the collecting portion 40.

When the coffee beans roasted while passing through the roasting portion 20 are discharged to the collecting portion 40, in order to cool down the heat of the roasted coffee beans to prevent the coffee beans from being roasted further by the heat of the coffee beans from the roasted state reached in the roasting portion 20 or to prevent coffee beans containing heat from being accumulated in large amounts in the collecting portion 40 and causing the taste of the coffee beans to be changed due to the heat of the large amount of coffee beans, the coffee bean cooling portion 41 may primarily cool down the coffee beans that are discharged from the roasting portion 20 and fall onto the collecting portion 40.

Specifically, the coffee bean cooling portion 41 may include a rotating shaft 411, a rotating plate 412, and a motor 413.

The rotating shaft 411 may be installed at a central portion of the collecting portion 40 and formed to have a height ranging from an upper portion of the collecting portion 40 to the central portion thereof. The rotating shaft 411 may rotate by the motor 413.

The rotating plate 412 may be fixed to an upper end of the rotating shaft 411 and rotate together as the rotating shaft 411 rotates, and the rotating plate 412 may be formed to have a diameter that is a predetermined length less than a diameter of an inlet of the collecting portion 40. Also, a cooling plate 4121 may be embedded in the rotating plate 412.

When the coffee beans withdrawn from the roasting portion 20 fall from the conveyor belt 31 and are discharged to the collecting portion 40 as the conveyor belt 31 rotates, the coffee beans may fall onto the rotating plate 412 of the collecting portion 40. The coffee beans may be primarily cooled down by cold air of the cooling plate 4121 embedded in the rotating plate 412.

Here, because the rotating plate 412 is being rotated by the rotating shaft 411, the coffee beans on the upper surface of the rotating plate 412 may gradually move to an outer side of the rotating plate 412 due to a centrifugal force, fall to a lower side of the rotating plate 412, and fall onto a bottom portion of the collecting portion 40.

In this way, using the coffee bean cooling portion 41, the roasted coffee beans can be collected after being primarily cooled.

Typical embodiments of the present disclosure have been described in detail above, but those of ordinary skill in the art to which the present disclosure pertains should understand that various modifications are possible to the above-described embodiments within the scope not departing from the scope of the present disclosure. Therefore, the scope of rights of the present disclosure should not be defined by being limited to the embodiments described above and should be defined by the claims below as well as their equivalents.

DESCRIPTION OF REFERENCE NUMERALS

| | |
|---|---|
| 1: coffee roasting apparatus | |
| 10: supply portion | 11: hopper |
| 111: vertical portion | 112: inclined portion |
| 12: feeding portion | 121: wing portion |
| 122: inlet | 20: roasting portion |
| 21: inner tube | 22: outer tube |
| 23: heater | 24: insertion portion |
| 25: withdrawal portion | 201: first roasting portion |
| 202: second roasting portion | 203: third roasting portion |
| 204: fourth roasting portion | 30: conveying portion |
| 31: conveyor belt | 32: rotating portion |
| 40: collecting portion | 41: coffee bean cooling portion |
| 411: rotating shaft | 412: rotating plate |
| 4121: cooling plate | 413: motor |
| 50: connection pipe | 51: gas supply portion |
| 52: exhaust tube | 53: dust collector |
| 60: discharge portion | 61: housing |
| 611: opening | 62: air blowing device |
| 63: collecting drum | |

MODES OF THE DISCLOSURE

The modes of the disclosure have been described above in the best mode of the disclosure.

The invention claimed is:
1. A coffee roasting apparatus comprising:
a roasting portion that is formed in a tubular shape having a predetermined length along an advancing direction and includes an inner tube having an inner space formed therein, an outer tube spaced a predetermined distance apart from an outer side of the inner tube and fixed to the inner tube, a plurality of heaters disposed between the inner tube and the outer tube to apply heat to the inner space of the inner tube to roast coffee beans, an insertion portion which is an open area formed at a front of the inner tube and the outer tube, and a withdrawal portion which is an open area formed at a rear of the inner tube and the outer tube, the roasting portion is formed to be separated into a plurality of roasting portions with each of the plurality of roasting portions in the inner space being temperature controlled to different temperatures by a corresponding heater among the plurality of heaters;

a conveying portion formed to pass through the roasting portion from the insertion portion at the front of the roasting portion to the withdrawal portion at the rear of the roasting portion and including a conveyor belt installed to be rotatable from the inside to outside of the roasting portion to repeatedly rotate along the same trajectory;

a supply portion installed at an upper side of the conveying portion at the front of the roasting portion to supply coffee beans so that one or more coffee beans continuously fall onto the conveying portion; and one or more discharge portions formed between the plurality of roasting portions to discharge coffee beans when the coffee beans are roasted to a desired level without being roasted further in a next roasting portion, each respective discharge portion being associated with one of the plurality of roasting portions, and each respective discharge portion comprising a housing, an air blowing device, and a collecting drum, wherein, in a state in which the conveyor belt repeatedly rotating along the same trajectory rotates, the coffee beans are supplied one at a time from the supply portion disposed at a front of the conveyor belt, and the coffee beans are each individually disposed while spaced apart from each other at predetermined intervals on an upper surface of the conveyor belt, as the conveyor belt rotates from the front to rear, the coffee beans are inserted into the roasting portion through the insertion portion, and the coffee beans inserted into the roasting portion are moved along the conveyor belt inside the roasting portion and roasted by being treated with heat of the roasting portion, as the conveyor belt rotates from the front to rear through the plurality of roasting portions, respective internal temperature of each of the plurality of roasting portions is set to gradually increase, and as the conveyor belt rotates, the coffee beans are sequentially withdrawn to the outside of the roasting portion through the withdrawal portion.

2. The coffee roasting apparatus of claim 1, further comprising a collecting portion disposed at a lower side of a rear of the conveying portion to collect the coffee beans roasted in the roasting portion that fall according to the rotation of the conveying portion.

3. The coffee roasting apparatus of claim 1, wherein:
the plurality of roasting portions are disposed to be spaced apart from each other at predetermined intervals; and
the coffee roasting apparatus further comprises a connection pipe disposed between the plurality of roasting portions disposed to be spaced apart to connect the spaced-apart roasting portions.

4. The coffee roasting apparatus of claim 3, wherein, in the connection pipe, a gas supply portion into which a mixed gas, which is a mixture of nitrogen and oxygen, is supplied to prevent carbonization of an outer surface of the coffee beans and an exhaust tube configured to discharge an exhaust gas and particulate matter inside the connection pipe to the outside are further installed.

\* \* \* \* \*